(12) United States Patent
Kulkarni et al.

(10) Patent No.: US 9,140,118 B2
(45) Date of Patent: Sep. 22, 2015

(54) MODELING THE SUSPENDABILITY OF FIBERS IN A TREATMENT FLUID USING EQUATIONS

(71) Applicant: HALLIBURTON ENERGY SERVICES, INC., Houston, TX (US)

(72) Inventors: Sandeep D. Kulkarni, Houston, TX (US); Matthew L. Miller, Houston, TX (US); Dale E. Jamison, Houston, TX (US); Kushabhau D. Teke, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/503,833

(22) Filed: Oct. 1, 2014

(65) Prior Publication Data
US 2015/0144332 A1    May 28, 2015

Related U.S. Application Data

(63) Continuation-in-part of application No. PCT/US2013/072110, filed on Nov. 26, 2013.

(51) Int. Cl.
| | | |
|---|---|---|
| *G06G 7/58* | (2006.01) | |
| *E21B 49/00* | (2006.01) | |
| *E21B 47/06* | (2012.01) | |
| *E21B 43/26* | (2006.01) | |
| *E21B 43/267* | (2006.01) | |

(52) U.S. Cl.
CPC .............. *E21B 49/008* (2013.01); *E21B 43/26* (2013.01); *E21B 43/267* (2013.01); *E21B 47/06* (2013.01); *E21B 47/065* (2013.01)

(58) Field of Classification Search
CPC ..... E21B 49/008; E21B 47/06; E21B 47/065; E21B 43/26; E21B 43/267
USPC .......................................................... 703/10
See application file for complete search history.

(56) References Cited

U.S. PATENT DOCUMENTS

| | | |
|---|---|---|
| 6,790,812 B2 | 9/2004 | Halliday et al. |
| 2002/0147113 A1 | 10/2002 | Green |
| 2003/0158045 A1 | 8/2003 | Jarrett |
| 2010/0250204 A1 | 9/2010 | Leonard et al. |
| 2011/0214870 A1 | 9/2011 | Shaarpour |

OTHER PUBLICATIONS

H. Soroush, J.H.B. Sampaio, Curtin U. "Investigation Into Strengthening Methods for Stabilizing Wellbores in Fractured Formations" SPE 101802, 2006, Society of Petrolium Engineers, 8 pages.*
R.M. Ahmed & N.E. Takach, Fiber Sweeps for Hole Cleaning, Presented at the SPE/ICoTA Coiled tubing & Well Intervention Conference & Exhibition, Apr. 1-2, Society of Petroleum Engineers (SPE), Dec. 2009, pp. 564-573, SPE 113746, SPE Drilling & Completion, The Woodlands, Texas, USA.
R.P. Chhabra, Drops and Particles in Non-Newtonian Fluids, Taylor & Francis Group, LLC, 2007, pp. 129-130, New York, USA.
Mahmoud Rajabian,Charles Dubois and Miroslav Grmela, Suspensions of Semiflexible Fibers in Polymeric Fluids: Rheology and Thermodynamics, Springer-Verlag 2005, Published online: Apr. 2, 2005, Rheol Acta (2005) 44: 521-535, DOI 10.1007/s00397-005-0434-7, CRASP, Ecole Polytechnique de Montreal, Centre-ville, Montreal, Quebec, Canada.

* cited by examiner

*Primary Examiner* — Dwin M Craig
(74) *Attorney, Agent, or Firm* — McGuireWoods LLP

(57) ABSTRACT

A method of predictive modeling of a treatment fluid comprises: determining the value of properties of a base fluid and insoluble particulates; providing a proposed suspending agent; performing a first calculation of the suspendability of the proposed suspending agent as determined by a yield gravity function equation; evaluating if the result from the first calculation indicates a stable treatment fluid comprising the base fluid, the insoluble particulates, and the proposed suspending agent, or if the result does not indicate a stable treatment fluid, then: modifying the value of at least one of the properties of the proposed suspending agent, base fluid, and/or insoluble particulate; and performing a second calculation, wherein the same or different property values are continued to be modified and the calculation is continued to be performed until the result indicates a stable treatment fluid; and introducing the stable treatment fluid into a wellbore.

20 Claims, No Drawings

MODELING THE SUSPENDABILITY OF FIBERS IN A TREATMENT FLUID USING EQUATIONS

TECHNICAL FIELD

Suspending agents can be used to uniformly distribute insoluble particles throughout a base fluid. The type of suspending agent and the properties of the suspending agent can be used to determine the suspendability of a suspending agent. The treatment fluid including the suspending agent can be used in oil or gas operations.

DETAILED DESCRIPTION

As used herein, the words "comprise," "have," "include," and all grammatical variations thereof are each intended to have an open, non-limiting meaning that does not exclude additional elements or steps. As used herein, the words "consisting essentially of," and all grammatical variations thereof are intended to limit the scope of a claim to the specified materials or steps and those that do not materially affect the basic and novel characteristic(s) of the claimed invention. For example, a test treatment fluid can consist essentially of the base fluid, the lost-circulation material, and the suspending agent. The test treatment fluid can contain other ingredients so long as the presence of the other ingredients does not materially affect the basic and novel characteristics of the claimed invention, i.e., so long as the test treatment fluid exhibits the desired lost-circulation material distribution.

As used herein, a "fluid" is a substance having a continuous phase that tends to flow and to conform to the outline of its container when the substance is tested at a temperature of 71° F. (22° C.) and a pressure of one atmosphere "atm" (0.1 megapascals "MPa"). A fluid can be a liquid or gas. A homogenous fluid has only one phase; whereas, a heterogeneous fluid has more than one distinct phase. A suspension is an example of a heterogeneous fluid. A heterogeneous fluid can be: a slurry, which includes a continuous liquid phase and undissolved solid particles as the dispersed phase; an emulsion, which includes a continuous liquid phase and at least one dispersed phase of immiscible liquid droplets; a foam, which includes a continuous liquid phase and a gas as the dispersed phase; or a mist, which includes a continuous gas phase and a liquid as the dispersed phase. A heterogeneous fluid will have only one continuous phase, but can have more than one dispersed phase. It is to be understood that any of the phases of a heterogeneous fluid (e.g., a continuous or dispersed phase) can contain dissolved or undissolved substances or compounds. As used herein, the phrase "aqueous-based" means a solution wherein an aqueous liquid is the solvent or a colloid wherein an aqueous liquid is the continuous phase. As used herein, the phrase "oil-based" means a solution wherein a hydrocarbon liquid is the solvent or a colloid wherein a hydrocarbon liquid is the continuous phase.

Oil and gas hydrocarbons are naturally occurring in some subterranean formations. In the oil and gas industry, a subterranean formation containing oil or gas is referred to as a reservoir. A reservoir may be located under land or off shore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir. The oil, gas, or water produced from the wellbore is called a reservoir fluid.

A well can include, without limitation, an oil, gas, or water production well, or an injection well. As used herein, a "well" includes at least one wellbore. The wellbore is drilled into a subterranean formation. The subterranean formation can be a part of a reservoir or adjacent to a reservoir. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered the region within approximately 100 feet radially of the wellbore. As used herein, "into a well" means and includes into any portion of the well, including into the wellbore or into the near-wellbore region via the wellbore.

A portion of a wellbore may be an open hole or cased hole. In an open-hole wellbore portion, a tubing string may be placed into the wellbore. The tubing string allows fluids to be introduced into or flowed from a remote portion of the wellbore. In a cased-hole wellbore portion, a casing is placed into the wellbore, which can also contain a tubing string. A wellbore can contain an annulus. Examples of an annulus include, but are not limited to: the space between the wall of the wellbore and the outside of a tubing string in an open-hole wellbore; the space between the wall of the wellbore and the outside of a casing in a cased-hole wellbore; and the space between the inside of a casing and the outside of a tubing string in a cased-hole wellbore.

During drilling operations, a wellbore is formed using a drill bit. A drill string can be used to aid the drill bit in drilling through a subterranean formation to form the wellbore. The drill string can include a drilling pipe. A treatment fluid adapted for this purpose is referred to as a drilling fluid or drilling mud. The drilling fluid may be circulated downwardly through the drilling pipe, and back up the annulus between the wellbore and the outside of the drilling pipe. During drilling or other operations such as completion, some of the base liquid of the treatment fluid can undesirably flow into the subterranean formation instead of remaining in the wellbore and being circulated back up to the wellhead. This is known as lost circulation. In order to overcome the problems associated with lost circulation, a lost-circulation material ("LCM") can be used. LCMs can be swellable or non-swellable, granular-shaped substances. As the treatment fluid is placed into the well, the LCM can eliminate or lessen the amount of liquid base fluid entering the subterranean formation. For example, the particles of the LCM can build upon each other and form a bridge over highly-permeable areas of the formation, such as natural fissures, fractures, and vugs, or induced fractures. The bridge can eliminate or reduce the amount of liquid base fluid entering the formation via the wellbore.

It is important to suspend the LCM uniformly throughout the base fluid in order for the LCM to reach the desired location within the wellbore and uniformly bridge or build to prevent or inhibit the lost circulation. However, it is difficult to know ahead of time whether a particular suspending agent will function effectively for a specific type of fluid with a specific type of LCM. Currently, experiments may have to be performed to determine the exact suspendability of a particular suspending agent given the exact parameters of a fluid and LCM. This experimental data can then be used at the well site to form the treatment fluid. It is readily apparent that conducting numerous experiments for each treatment fluid that utilizes LCMs can be quite expensive and require vast amounts of time. There is a need for being able to calculate the suspendability of a suspending agent whereby the results can be used to modify one or more properties of the suspending agent to effectively suspend the LCM in a treatment fluid.

It has been discovered that the suspendability of the fibers can be calculated and modeled using a yield gravity function equation with the properties of the treatment fluid, the LCM, and a proposed fiber suspending agent.

It is to be understood that if any laboratory test (e.g., LCM Distribution) requires the test be performed at a specified temperature and possibly a specified pressure, then the temperature and pressure of the test composition is ramped up to the specified temperature and pressure after being mixed at ambient temperature and pressure. For example, the composition can be mixed at 71° F. (22° C.) and 1 atm (0.1 MPa) and then placed into the testing apparatus and the temperature of the composition can be ramped up to the specified temperature. As used herein, the rate of ramping up the temperature can be in the range of about 1° F./min to about 10° F./min to simulate actual wellbore conditions. After the composition is ramped up to the specified temperature and possibly specified pressure, the composition is maintained at that temperature and pressure for the duration of the testing.

As used herein, the "LCM Distribution" test was performed as follows. The base fluid was hot rolled at the specified temperature for a specified period of time under a specific pressure. The base fluid can include a multitude of ingredients and can be, for example, a drilling mud. The treatment fluid was then mixed by first adding the hot-rolled base fluid to a mixing container. The lost-circulation material "LCM" and the suspending agent fibers were added to the base fluid. The fluid was then mixed thoroughly using a spatula. The mixture was then heated to the specified temperature at ambient pressure (~1 atm). The mixture was then poured into a glass vessel that was pre-heated to the specified temperature. The glass vessel containing the mixture was then placed into a pre-heated stainless steel aging cell. The mixture was then static aged for 2 hours at the specified temperature. The glass vessel was then placed into a water bath for about 10 minutes (min) to cool down. The mixture in the glass vessel was then separated into two equal sections, the top half and the bottom half. The quantity of LCM in each half was obtained by filtering each mixture half through an appropriately sized mesh depending on the particle size of the LCM added to the base fluid. The LCM particulates and fibers were rinsed with water or base oil to remove any adhered base fluid. The LCM and fibers from each half were dried in an oven at 221° F. (105° C.), then cooled, and then weighed. The following equation was used to determine the LCM Distribution.

$$\% \ LCM^{Top} = \frac{LCM^{Top}}{LCM^{Top} + LCM^{Bottom}} * 100$$

where $LCM^{Top}$ is the weight of LCM in the top half and $LCM^{Bottom}$ is the weight of the LCM in the bottom half. It should be noted that the fibers can be separated from the LCM and just the LCM can be weighed or both the LCM plus the fibers can be weighed in which case the preceding equation would include the weight of the LCM plus the fibers in each half. An LCM Distribution of 50% indicates that zero settling occurred because 50% of the LCM (and optionally the fibers too) still remains in the top half of the fluid. By contrast, an LCM Distribution of 0% indicates that all of the LCM settled to the bottom half of the fluid. As used herein, an LCM Distribution between 40% to 50% is considered excellent suspendability, greater than or equal to 30% is considered a stable fluid, 5% to 30% is considered weak suspendability, and <5% is considered no suspendability.

According to an embodiment, a method of predictive modeling of a treatment fluid comprises: (A) determining the value of one or more properties of a base fluid; (B) determining the value of one or more properties of an insoluble particulates; (C) providing a proposed suspending agent; (D) performing a first calculation of the suspendability of the proposed suspending agent as determined by a yield gravity function equation based on the value of the one or more properties of the base fluid and the insoluble particulates, and the value of at least one property of the proposed suspending agent; (E) evaluating if the result from the first calculation indicates a stable treatment fluid comprising the base fluid, the insoluble particulates, and the proposed suspending agent, or if the result does not indicate a stable treatment fluid, then: (i) modifying the value of at least one of the properties of the proposed suspending agent, the base fluid, the insoluble particulate, or combinations thereof; and (ii) performing a second calculation of the suspendability of the proposed suspending agent as determined by the yield gravity function equation based on the modified value, wherein the same or different property values are continued to be modified and the calculation is continued to be performed until the result indicates a stable treatment fluid; and (F) introducing the stable treatment fluid into a wellbore.

The discussion of preferred embodiments regarding the treatment fluid or any ingredient in the treatment fluid, is intended to apply to all of the method embodiments. Any reference to the unit "gallons" means U.S. gallons.

The treatment fluid includes a base fluid. The treatment fluid can be a heterogeneous fluid, for example, a slurry or an emulsion or invert emulsion. Any of the phases of the heterogeneous fluid can contain dissolved substances and/or undissolved substances. The base fluid can be the liquid continuous phase of the heterogeneous fluid. The base fluid can be an aqueous liquid, an aqueous miscible liquid, or a hydrocarbon liquid. Suitable aqueous-based fluids can include, but are not limited to, fresh water; saltwater (e.g., water containing one or more water-soluble salts dissolved therein); brine (e.g., saturated salt water); seawater; and any combination thereof. Suitable aqueous-miscible fluids can include, but are not limited to, alcohols (e.g., methanol, ethanol, n-propanol, isopropanol, n-butanol, sec-butanol, isobutanol, and t-butanol); glycerins; glycols (e.g., polyglycols, propylene glycol, and ethylene glycol); polyglycol amines; polyols; any derivative thereof; any in combination with salts (e.g., sodium chloride, calcium chloride, magnesium chloride, potassium chloride, sodium bromide, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate); any in combination with an aqueous-based fluid; and any combination thereof.

The hydrocarbon liquid can be synthetic. The hydrocarbon liquid can be selected from the group consisting of: a fractional distillate of crude oil; a fatty derivative of an acid, an ester, an ether, an alcohol, an amine, an amide, or an imide; a saturated hydrocarbon; an unsaturated hydrocarbon; a branched hydrocarbon; a cyclic hydrocarbon; and any combination thereof. Crude oil can be separated into fractional distillates based on the boiling point of the fractions in the crude oil. An example of a suitable fractional distillate of crude oil is diesel oil. A commercially-available example of a fatty acid ester is PETROFREE® ESTER base fluid, marketed by Halliburton Energy Services, Inc. The saturated hydrocarbon can be an alkane or paraffin. The paraffin can be an isoalkane (isoparaffin), a linear alkane (paraffin), or a cyclic alkane (cycloparaffin). An example of an alkane is BAROID ALKANE™ base fluid, marketed by Halliburton Energy Services, Inc. Examples of suitable paraffins include, but are not limited to: BIO-BASE 360® (an isoalkane and n-alkane); BIO-BASE 300™ (a linear alkane); BIO-BASE 560® (a blend containing greater than 90% linear alkanes); and ESCAID 110™ (a mineral oil blend of mainly alkanes and cyclic alkanes). The BIO-BASE liquids are available from Shrieve Chemical Products, Inc. in The Woodlands, Tex. The ESCAID liquid is available from ExxonMobil in Houston, Tex. The unsaturated hydrocarbon can be an alkene, alkyne, or aromatic. The alkene can be an isoalkene, linear alkene, or cyclic alkene. The linear alkene can be a linear alpha olefin or an internal olefin. An example of a linear alpha olefin is NOVATEC™, available from M-I SWACO in Houston, Tex. Examples of internal olefins-based drilling fluids include, ENCORE® drilling fluid and ACCOLADE® internal olefin and ester blend drilling fluid, marketed by Halliburton Energy Services, Inc. An example of a diesel oil-based drilling fluid is INVERMUL®, marketed by Halliburton Energy Services, Inc.

The treatment fluid includes an insoluble particulate. The insoluble particulate can be without limitation a lost-circulation material ("LCM"), drilling cuttings, or a proppant. An LCM inhibits or prevents some or all of the treatment fluid from penetrating into a subterranean formation, wherein the wellbore penetrates the subterranean formation. The LCM can be of any material known in the art suitable for use as an LCM in a wellbore operation. Depending on the size of the pores of the subterranean formation and the size of the bridges formed by the LCM, the bridges can help inhibit or prevent fluid flow from the wellbore into the formation or also from the formation into the wellbore (depending on the specific oil or gas operation being performed). It should be understood that while some of the treatment fluid may penetrate into the subterranean formation, the majority of the treatment fluid should remain in the wellbore. Moreover, as used herein, the term "penetrate" and all grammatical variations thereof is not intended to preclude some penetration of a certain depth, for example, a few inches, into the formation, but rather is meant to include penetration of depths that would be considered in the industry as lost circulation, and could likely impair oil or gas operations or increase the cost of performing the oil or gas operation. According to an embodiment, the LCM is in at least a sufficient concentration such that fluid is inhibited or prevented from flowing into the formation from the wellbore. The LCM can be in a concentration, for example, in the range of about 0.5 to about 200 pounds per barrel of the base fluid or about 0.5% to about 50% by volume of the base fluid.

Suitable LCMs include, but are not limited to: ground coal; petroleum coke; sized calcium carbonate; asphaltene; perlite; cellophane; cellulose; ground tire material; ground oyster shell; vitrified shale; a plastic material; paper fiber; wood; cement; hardened foamed cement; glass; foamed glass; sand; bauxite; a ceramic material; a polymeric material (such as ethylene vinyl acetate); a polytetrafluoroethylene material; a nut shell; a seed shell piece; a fruit pit piece; clay; silica; alumina; fumed carbon; carbon black; graphite; mica; titanium oxide; meta-silicate; calcium silicate; kaolin; talc; zirconia; boron; fly ash; a hollow glass microsphere; any composite particle thereof; and any combination thereof. Examples of suitable commercially-available LCMs include, but are not limited to, WALL-NUT®, BARACARB®, STEELSEAL®, N-SQUEEZE™, N-SEAL™, N-PLEX™, HYDRO-PLUG®, DURO-SQUEEZE™ H, BAROFIBRE®, and BAROFIBRE® O, marketed by Halliburton Energy Services, Inc. LCM particles that are substantially non-spherical (e.g., particles having sphericity values at least below 1) can have a length to diameter aspect ratio in the range of about 1:1 to about 10:1.

The treatment fluid also includes a suspending agent. The suspending agent consists of a plurality of fibers. The fibers can be in dry form or in a liquid suspension. The fibers can be natural, synthetic, biodegradable, and/or biocompatible. Examples of synthetic fibers include, but are not limited to, polymers or copolymers composed of polypropylene, polyaramid, polyester, polyacrylonitrile, and polyvinyl alcohol. Examples of biodegradable fibers include, but are not limited to, fibers composed of modified cellulose, chitosan, soya, modified chitosan, polycaprolactone, polylactic acid, poly(3-hydroxybutyrate), polyhydroxy-alkanoates, polyglycolic acid "PGA", polylactic acid "PLA", polyorthoesters, polycarbonates, polyaspartic acid, polyphosphoesters, soya, or copolymers thereof. Examples of other suitable fibers include, fibers of cellulose including viscose cellulosic fibers, oil coated cellulosic fibers, and fibers derived from a plant product like paper fibers; carbon including carbon fibers; melt-processed inorganic fibers including basalt fibers, wollastonite fibers, non-amorphous metallic fibers, ceramic fibers, and glass fibers. The fibers can also be a composite fiber made from any combination of the preceding materials. There can also be a mixture of fibers wherein the fibers are composed of different substances. A commercially-available example of suitable fibers is BAROLIFT®, sweeping agent, marketed by Halliburton Energy Services, Inc., which is a synthetic fiber. The fibers can have a fiber length, diameter, and concentration. The fibers can have a length to diameter aspect ratio in the range of about 2:1 to about 5,000:1.

The treatment fluid can also contain other ingredients, such as a viscosifier; a filtration control agent; a shale stabilizer; a weighting agent; a pH buffer; an emulsifier; an emulsifier activator (e.g., lime); a dispersion aid; a corrosion inhibitor; an emulsion thinner; an emulsion thickener; a gelling agent; a surfactant; a foaming agent; a gas; a breaker; a biocide; a chelating agent; a scale inhibitor; a gas hydrate inhibitor, a mutual solvent; an oxidizer; a reducer; a friction reducer; a clay stabilizing agent; an oxygen scavenger; and any combination thereof.

A method of predictive modeling of a treatment fluid comprises determining the value of one or more properties of the base fluid and the insoluble particulate. The one or more properties of the base fluid can be, without limitation, the density of the base fluid and the insoluble particulate and possibly other ingredients. The one or more properties of the insoluble particulate can be, without limitation, the average particle size of the insoluble particulate and the density of the insoluble particulate. The methods include providing a proposed suspending agent.

The methods include performing a first calculation of the suspendability of the proposed suspending agent as determined by a yield gravity function equation based on the value of the one or more properties of the base fluid and the insoluble particulate, and the value of at least one property of the proposed suspending agent. The properties of the proposed suspending agent include, but are not limited to, the fiber concentration in weight/volume units, the density of the fibers, number of fibers per unit volume, average fiber length, average fiber diameter, and the stiffness of the fibers.

Generally the yield gravity function of the present invention may be calculated using the equation:

$$Y_G^f = \frac{\tau_0 * f(\phi_f, l_f, d_f, \rho_f, n_f, s_f)}{g * d * (\rho_p - \rho)} \qquad \text{Eq. 1}$$

where:

$\tau_0$ is the rheological properties of the base fluid or the base fluid plus the insoluble particulate plus other optional ingredients;

$\phi_f$ is the w/v concentration of the fibers;

$l_f$ is the fiber length or the average fiber length based on a length distribution;

$d_f$ is the diameter of the fibers or the average fiber diameter based on a diameter distribution;

$\rho_f$ is the density of the fibers or the average density of the fibers based on a density distribution;

$n_f$ is the number of fibers per unit volume of the base fluid;

$s_f$ is the stiffness of the fibers;

g is acceleration due to gravity;

d is the size of the individual insoluble particulates or the average size based on the size distribution of the insoluble particulates;

$\rho_p$ is density of the insoluble particulates; and $\rho$ is density of the base fluid or the base fluid plus the insoluble particulates plus other optional ingredients. Various forms of the function of the suspending agent properties can include, but are not limited to, a power function; an exponential function; a linear function; and any combination thereof.

An alternative to the equation above is provided as follows:

$$Y_G^f = \frac{\tau_0 * \left[1 + \sum \alpha * n_f * l_f^3 \right]}{g * d * (\rho_p - \rho)} \qquad \text{Eq. 2}$$

where $n_f * l_f^3$ defines a dimensionless concentration of the fiber suspending agent; and $\alpha$ is a numerical constant for the particular type of fiber. It should be noted that $\alpha$ can be determined experimentally in a laboratory. It should also be noted that a single type of fiber can be used in which case the summation is not needed. However, there can also be a mixture of two or more different types of fibers that can be summed to determine the yield gravity function. For any of the following equations that utilize different fibers, the properties of the fibers can be summed.

The rheological properties ($\tau_0$) can be based on any one, or any combination of, shear stress at selected shear rate (s), the low shear yield point ("LSYP"), the yield stress estimated from a visco-plastic model (e.g., the Bingham plastic model or the Herschel-Bulkley yield stress), or the gel strength (e.g., the 10 sec gel strength, 10 min gel strength, 30 min gel strength, or a gel strength at any other desired time interval).

The concentration of the insoluble particulates can be added to the yield gravity function equation 1 or 2, shown added to Eq. 1 as follows:

$$Y_G^f = \frac{\tau_0 * f[\phi] * f(\phi_f, l_f, d_f, \rho_f, n_f, s_f)}{g * d * (\rho_p - \rho)} \qquad \text{Eq. 3}$$

where $f[\phi]$ is the function of concentration of the insoluble particulates. Various forms of the function, $f[\phi]$, may include, but are not limited to, a power function; an exponential function; a linear function; and any combination thereof.

In other embodiments, the temperature and pressure of the wellbore in the subterranean formation may be taken into account to calculate the yield gravity function. This may be particularly relevant because the density of the stable treatment fluid may increase as pressure increases, but decrease as temperature increases. However, when the area to be treated in the subterranean formation is particularly deep, the temperature effects tend to dominate the pressure effects. Also, temperature and pressure may influence the rheological properties, $\tau_0$. The yield gravity function can take into account the bottomhole temperature and pressure of the wellbore by modifying equation 1 or 2, shown added to Eq. 1 as follows:

$$Y_G^f = \frac{\tau_0(P, T) * f(\phi_f, l_f, d_f, \rho_f, n_f, s_f)}{g * d * (\rho_p - \rho(P, T))} \qquad \text{Eq. 4}$$

where P,T is the bottomhole pressure and temperature of the wellbore.

In other embodiments, when the base fluid is a liquid hydrocarbon, the oil-to-water ratio may be taken into account to calculate the yield gravity function. In this embodiment, the yield gravity function can be calculated by modifying equation 1 or 2, shown added to Eq. 1 as follows:

$$Y_G^f = \frac{\tau_0 * f[o/w] * f(\phi_f, l_f, d_f, \rho_f, n_f, s_f)}{g * d * (\rho_p - \rho)} \qquad \text{Eq. 5}$$

where $f[o/w]$, is the function of the oil-to-water ratio of the proposed treatment fluid. Various forms of the function, $f[o/w]$, may include, but are not limited to, a power function; an exponential function; a linear function; and any combination thereof.

It should be noted that any or all of the above equations can be used for the yield gravity function equation. The exact variables or properties chosen to include can depend on the specific oil or gas operation. Various combinations of the equations disclosed herein can also be made to determine which optional variables should be included. In some embodiments, the function of the various properties discussed previously including, the concentration of the insoluble particulates, the size or average size of the insoluble particulates, the oil-to-water ratio of the treatment fluid, and the dependence of properties on the bottomhole pressure and temperature of the subterranean formation, for example, may be taken into account.

In those embodiments where all of these properties are taken into account, the yield gravity function may be calculated based on the following formula, from which equations (1) through (5) above may be considered subsets:

$$Y_G^f = \frac{f[\tau_0(P, T) * f[o/w] * f[\phi] * f(\phi_f, l_f, d_f, \rho_f, n_f, s_f)}{g * f[d] * f[(\rho_p - \rho(P, T))]} \qquad \text{Eq. 6}$$

Various forms of the functions, $f[\tau_0(P,T)]$, $f[o/w]$, $f[\phi]$, $f[\phi_f, l_f, d_f, \rho_f, n_f, s_f]$, $f[d]$, and $f[(\rho_p - \rho(P,T))]$ can include, but are not limited to, a power function; an exponential function; a linear function; and any combination thereof.

As can be seen from the preceding equations, in order to perform the first calculation, the values of the properties of the base fluid and insoluble particulate can be determined from the wellsite and used in the calculations. These values can be known ahead of time and will depend on the specific oil or gas operation to be performed. By way of example, if the treatment fluid is a drilling fluid, then the density (ρ) and rheology ($\tau_o$) will be different compared to a spacer fluid or treatment fluid. Moreover, depending on the permeability of the subterranean formation, the concentration and even type of insoluble particulate can vary significantly. It is important to be able to accurately calculate if a proposed suspending agent will be able to create a stable treatment fluid. As used herein, a "stable treatment fluid" is a fluid wherein no greater than 70% of the insoluble particulates accumulate in the bottom half of a column of the base fluid. In other words, the LCM distribution is at least 30%, such that at least 30% of the LCM from a uniform mixture remains in the top half of the column of base fluid via the suspendability of the suspending agent. Accordingly, a result from the yield gravity function calculation of greater than at least 0.8, more preferably greater than or equal to 1, is indicative of a stable treatment fluid.

The treatment fluid can be any fluid that contains or will contain the insoluble particulates. Examples of such a treatment fluid can include, but are not limited to, a drilling fluid or a fracturing fluid. The insoluble particulates that need to be suspended can include a lost-circulation material or drill cuttings for a drilling fluid or proppant for a fracturing fluid. There can be other fluids not specifically mentioned with a variety of insoluble particulates that need to be suspended that one of ordinary skill in the art would be able to calculate the suspendability of a particular fiber suspending agent using the benefits of this disclosure.

The methods include the step of evaluating if the result from the first calculation indicates a stable treatment fluid comprising the base fluid, the insoluble particulate, and the proposed suspending agent. If the result from the first calculation is greater than 0.8, then the result indicates a stable treatment fluid and no more calculations may need to be performed. Accordingly, the properties of the fiber suspending agent used in the first calculation can be used in the treatment fluid and the insoluble particulate should then be properly suspended in the base fluid.

However, if the first calculation does not indicate a stable treatment fluid (i.e., the result is less than 0.8), then the methods include the steps of modifying the value of at least one of the properties of the proposed suspending agent, the base fluid, the insoluble particulate, or combinations thereof, and performing a second calculation of the suspendability of the proposed suspending agent as determined by the yield gravity function equation based on the modified value, wherein the same or different property values are continued to be modified and the calculation is continued to be performed until the result indicates a stable treatment fluid. In some instances, one or more properties of the base fluid can be modified to yield a stable treatment fluid. Moreover, the exact insoluble particulate to be used in the treatment fluid can be modified based on one or more properties of the particulate in order to yield a stable treatment fluid.

The following are some examples of performing the calculations according to certain embodiments. The following examples are not the only examples that could be given to illustrate the embodiments disclosed herein and are not meant to limit the scope of the invention. The following examples depict modifications to the proposed properties of the suspending agent; however, it is to be understood that modifications to the base fluid, the insoluble particulate, or all three (the base fluid, insoluble particulate, and suspending agent) can be made to yield a stable treatment fluid. The rheology ($\tau_o$) and density (ρ) values are obtained from the fluid that is to be used in the oil or gas operation. The type and particle size of an LCM insoluble particulates, for example, that is needed to prevent or inhibit lost circulation into the subterranean formation are determined, for example using WELLSET™ software marketed by Halliburton Energy Services, Inc. These values for the properties of the fluid and LCM are then used for the yield gravity function equation calculations. Other properties, such as the downhole temperature and pressure can also be determined from the worksite and used in the calculation(s). A proposed suspending agent can be provided wherein a value for at least one fiber property is proposed, for example the first calculation can include a fiber concentration of 1 pound per barrel (ppb) of the fluid. The first calculation is performed and the result could be 1.1. This result indicates a stable treatment fluid and no further calculations are needed to be performed.

However, according to another example, suppose the result from the first calculation using the 1 ppb fiber concentration is 0.6. This result indicates that the treatment fluid would not be stable. The value for the concentration can be increased to be used in the second calculation from 1 ppb of the base fluid to 1.5 ppb. That result can be evaluated to determine if the new concentration would provide a stable treatment fluid. According to an embodiment, the same or different property values are continued to be modified and/or included or excluded in the performance of the calculations. For example, other properties of the fiber suspending agent can also be included in the second and/or subsequent calculations. For example, the concentration of the fiber can be increased to 1.5 ppb and a fiber length of 4 millimeters (mm) can be included in the calculation. If the result of this calculation does not indicate a stable treatment fluid, then the value of only one of the fiber properties (for example, just the fiber length) can be modified while keeping the other value(s) the same (for example, the concentration); or the values for both or all of the properties can be modified. It is to be understood that numerous changes to the values of the properties of the fiber suspending agent can be modified for each calculation. Moreover, values for fiber properties can be included and removed as desired between calculations, so long as there is a value for at least one of the fiber properties included in the calculation. The yield gravity function calculation is continued to be performed based on the modified values, added values, and optionally removed values of the properties of the proposed suspending agent until the result indicates a stable treatment fluid.

The methods can further include performing one or more optimization calculations using the yield gravity function equation. This embodiment can be useful when the result indicates a stable treatment fluid, but possibly the exact concentration of the proposed suspending agent may need to be optimized to save on cost. For example, suppose a proposed suspending agent concentration of 2 ppb returns a result of 1.1. This result is higher than the necessary 0.8 or preferably 1.0 for a stable fluid. Therefore, one can predict that it may be possible to obtain a stable fluid with a decreased concentration of the fiber suspending agent. Accordingly, another calculation can be performed with a slightly lower concentration value, such as 1.5 ppb. This result can be evaluated and the values for the concentration of the proposed suspending agent can continue to be modified until the concentration that yields a stable treatment fluid is optimized.

In some embodiments, the equivalent static density or the equivalent circulating density of the treatment fluid used to treat a specific subterranean is calculated. Thereafter, the values of the proposed suspending agent are modified so as to achieve a yield gravity function result that indicates a stable treatment fluid.

As used herein, the term "equivalent static density" refers to the hydrostatic pressure exerted by the treatment fluid at any particular depth in a subterranean formation. The equivalent static density is a function of the density of the treatment fluid and the height of the fluid column. As used herein, the term "equivalent circulating density" refers to the sum of the hydrostatic pressure of the head of the treatment fluid column within a subterranean formation and the pressure loss due to friction in the subterranean formation. The pressure loss due to friction within the subterranean formation refers to the loss in pressure during the flow of the treatment fluid in the subterranean formation due to contact between the fluid and the formation. The equivalent static density and equivalent circulating density are known parameters that may be determined by any method known to those of ordinary skill in the art. In some embodiments, the equivalent static density and/or equivalent circulating density are substantially equal to or greater than the pore pressure of the wellbore in the subterranean formation and substantially equal to or less than the fracture gradient of the wellbore in the subterranean formation. As used herein, the term "pore pressure" refers to the pressure of subsurface formation fluids within a subterranean formation. As used herein, the term "fracture gradient" refers to the minimum downhole pressure required to induce fractures in a subterranean formation.

In some embodiments, the equivalent static density or the equivalent circulating density are calculated by taking into account the downhole temperature and pressure conditions of the subterranean formation. The temperature and pressure conditions of the subterranean formation may be particularly important factors to consider when, for example, calculating the equivalent static density or the equivalent circulating density of a particularly deep, hot wellbore in a subterranean formation. Failing to include these conditions may cause the equivalent static density or the equivalent circulating density calculations to be in error, often substantially in error.

In some embodiments, the values of the properties of the proposed suspending agent are modified not only based on the yield gravity function result, but also so as to achieve an equivalent static density or an equivalent circulating density within an acceptable range to maintain wellbore stability during drilling operations. The acceptable range of equivalent static density and equivalent circulating density are dependent upon the behavior of the treatment fluid containing the LCM and the proposed suspending agent and the geometry and conditions of the particular subterranean formation to be treated, such as, for example, the fracture gradient value, pore gradient value, etc.

The suspendability of the proposed suspending agent can also be determined experimentally in a laboratory using the LCM distribution test. The properties of the fiber suspending agent can be modified until the LCM distribution test indicates a stable treatment fluid. Of course if the insoluble particulate is not an LCM, then the exact insoluble particulate would be used for the LCM Distribution test instead of LCM. Obviously, using the yield gravity function equation to perform one or more calculations to determine the suspendability of the proposed suspending agent can be much quicker and more cost effective compared to the laboratory tests.

The methods also include introducing the stable treatment fluid into a wellbore. The wellbore can penetrate the subterranean formation. The stable treatment fluid would include the mixture of the base fluid and the insoluble particulate and the proposed suspending agent that yielded a stable treatment fluid from the calculation(s) and/or the laboratory LCM distribution test. The stable treatment fluid that is introduced into the wellbore can include other ingredients. Moreover, the stable treatment fluid can include the optimized proposed suspending agent. By way of example, the optimum calculation result could be from a fiber having a length of 12 mm and a concentration of 0.5 ppb. Accordingly, the stable treatment fluid that is introduced into the wellbore would include the fiber at a length of 12 mm and at a concentration of 0.5 ppb of the treatment fluid.

EXAMPLES

To facilitate a better understanding of the preferred embodiments, the following examples of certain aspects of the preferred embodiments are given. The following examples are not the only examples that could be given according to the preferred embodiments and are not intended to limit the scope of the invention.

Unless stated otherwise, the treatment fluids were tested according to the procedure for the specific test as described in The Detailed Description section above. The yield gravity function equation used in the calculations was Eq. 2, wherein a was 0.0015. Treatment fluid A had a density of 17 pounds per gallon (2.0 kilograms per liter) and included a NaCl brine as the base fluid; BARAZAN® D PLUS visosifier at a concentration of 0.65 pounds per barrel of the treatment fluid (ppb); PAC™-R fluid loss additive at a concentration of 1 ppb; DEXTRID® filtration control agent at a concentration of 2 ppb; BAROID® weighting agent in a concentration sufficient to produce the 17 ppg density treatment fluid; and BARABUF® pH buffer in a concentration of 0.15 ppb.

Table 1 provides rheology, low-shear yield point "LSYP", and 10 second and 10 minute yield strength data for Treatment fluid A using FANN 35 rheometer to be used in the yield gravity function equation.

TABLE 1

| | Rheology | | | | | | LSYP (lb/100 sq. ft.) | 10 S/10 min gel strength (lb/100 sq. ft.) |
|---|---|---|---|---|---|---|---|---|
| rpm | 600 | 300 | 200 | 100 | 6 | 3 | 5 | 7/9 |
| Dial Reading (lb/100 sq. ft.) | 127 | 84 | 67 | 46 | 9 | 7 | | |

Table 2 contains fiber length in millimeters "mm," fiber concentration in pounds per barrel of Treatment fluid A "ppb," LCM distribution data, and yield gravity function calculation results for the Treatment fluid A further containing an insoluble particulate of BARACARB® lost-circulation material "LCM" at a concentration of between 4-5% by volume of Treatment fluid A and varying concentrations and fiber lengths of BAROLIFT® synthetic fiber as the suspending agent. BARACARB® lost-circulation material was ground marble having a particle size in the range of 1,400 to 1,680 micrometers and a density of 2.7 grams per cubic centimeter. The LCM distribution test was performed after hot rolling for 16 hours and static aging for 2 hours at a temperature of 150° F. (66° C.).

TABLE 2

| Fiber Length (mm) | Fiber Concentration (ppb) | LCM Distribution | Yield Gravity Function |
|---|---|---|---|
| 3 | 3 | 20.0% | 0.8 |
| 3 | 6 | 48.0% | 1.0 |
| 4 | 0.5 | 7.2% | 0.6 |
| 6 | 1 | 7.9% | 0.8 |
| 6 | 2 | 47.0% | 1.1 |
| 8 | 0.5 | 18.7% | 0.8 |
| 12 | 0.5 | 43.0% | 1.1 |

As can be seen in Table 2, there is a direct correlation between the LCM distribution laboratory results and the calculated yield gravity function "YGF" results. YGF results of 1.0 or higher correspond to LCM Distribution results of 40% or greater. This indicates that the calculated YGF results will track experimental laboratory results to indicate if the suspending agent will provide a stable fluid. As can also be seen in Table 2, fiber length and fiber concentration are inversely proportional. For example, for a given concentration, 0.5 ppb, the longer the fiber length, the better suspendability of the fibers. Also, for a given fiber length, 3 mm or 6 mm, an increase in concentration can yield a stable fluid. Therefore, the suspendability of a particular fiber suspending agent can be calculated by modifying the values for at least the fiber length or fiber concentration, or at least the fiber length and concentration. These values can be modified to determine the proper fiber and properties of the fiber to use in a particular treatment fluid and also used to optimize the properties of the fiber suspending agent to be included in the treatment fluid.

The exemplary fluids and additives disclosed herein may directly or indirectly affect one or more components or pieces of equipment associated with the preparation, delivery, recapture, recycling, reuse, and/or disposal of the disclosed fluids and additives. For example, the disclosed fluids and additives may directly or indirectly affect one or more mixers, related mixing equipment, mud pits, storage facilities or units, fluid separators, heat exchangers, sensors, gauges, pumps, compressors, and the like used to generate, store, monitor, regulate, and/or recondition the exemplary fluids and additives. The disclosed fluids and additives may also directly or indirectly affect any transport or delivery equipment used to convey the fluids and additives to a well site or downhole such as, for example, any transport vessels, conduits, pipelines, trucks, tubulars, and/or pipes used to fluidically move the fluids and additives from one location to another, any pumps, compressors, or motors (e.g., topside or downhole) used to drive the fluids and additives into motion, any valves or related joints used to regulate the pressure or flow rate of the fluids, and any sensors (i.e., pressure and temperature), gauges, and/or combinations thereof, and the like. The disclosed fluids and additives may also directly or indirectly affect the various downhole equipment and tools that may come into contact with the fluids and additives such as, but not limited to, drill string, coiled tubing, drill pipe, drill collars, mud motors, downhole motors and/or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components, and the like.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention. While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A method of predictive modeling of a treatment fluid comprising:
    (A) determining the value of one or more properties of a base fluid;
    (B) determining the value of one or more properties of insoluble particulates;
    (C) providing a proposed suspending agent;
    (D) performing a first calculation of the suspendability of the proposed suspending agent as determined by a yield gravity function equation based on the value of the one or more properties of the base fluid and the insoluble particulates, and the value of at least one property of the proposed suspending agent;
    (E) evaluating if the result from the first calculation indicates a stable treatment fluid comprising the base fluid, the insoluble particulates, and the proposed suspending agent, or if the result does not indicate a stable treatment fluid, then:
        (i) modifying the value of at least one of the properties of the proposed suspending agent, the base fluid, the insoluble particulate, or combinations thereof; and
        (ii) performing a second calculation of the suspendability of the proposed suspending agent as determined by the yield gravity function equation based on the modified value, wherein the same or different property values are continued to be modified and the calculation is continued to be performed until the result indicates a stable treatment fluid; and
    (F) introducing the stable treatment fluid into a wellbore.

2. The method according to claim 1, wherein the properties of the base fluid include the rheological properties of the base fluid or the rheological properties of the base fluid plus the insoluble particulates plus other optional ingredients; and the density of the base fluid or the density of the base fluid plus the insoluble particulates plus other optional ingredients.

3. The method according to claim 2, wherein the rheological properties are based on any one, or any combination of, shear stress at a selected shear rate, the low shear yield point, the yield stress estimated from a visco-plastic model, or the gel strength.

4. The method according to claim 1, wherein the properties of the insoluble particulates include the size of the individual insoluble particulates or the average size based on the size distribution of the insoluble particulates; and the density of the insoluble particulates.

5. The method according to claim 1, wherein the suspending agent consists of a plurality of fibers.

6. The method according to claim 5, wherein properties of the proposed suspending agent include: the concentration of the fibers as weight per volume of the base fluid; the fiber length or the average fiber length based on a length distribution; the diameter of the fibers or the average fiber diameter based on a diameter distribution; the density of the fibers or the average density of the fibers based on a density distribution; the number of fibers per unit volume of the base fluid; and the stiffness of the fibers.

7. The method according to claim 1, wherein the concentration of the insoluble particulates is included in the yield gravity function equation.

8. The method according to claim 1, wherein the effects of temperature and pressure from the wellbore on the properties of the base fluid is included in the yield gravity function equation.

9. The method according to claim 1, wherein the base fluid is a liquid hydrocarbon and the oil-to-water ratio is included in the yield gravity function equation.

10. The method according to claim 1, further comprising calculating the equivalent static density or the equivalent circulating density of the treatment fluid used to treat a portion of the wellbore.

11. The method according to claim 10, wherein the values of the properties are modified to achieve an equivalent static density or an equivalent circulating density within an acceptable range.

12. The method according to claim 1, wherein the treatment fluid contains or will contain the insoluble particulates.

13. The method according to claim 12, wherein the treatment fluid is a drilling fluid.

14. The method according to claim 13, wherein the insoluble particulates are drill cuttings, a lost-circulation material, or combinations thereof.

15. The method according to claim 12, wherein the treatment fluid is a fracturing fluid.

16. The method according to claim 15, wherein the insoluble particulates are proppant.

17. The method according to claim 1, wherein a result from the yield gravity function calculation of greater than at least 0.8 is indicative of a stable treatment fluid.

18. The method according to claim 1, wherein the step of introducing comprises pumping the stable treatment fluid into the wellbore using a pump.

19. A method of predictive modeling of a treatment fluid comprising:
(A) determining the value of one or more properties of a base fluid;
(B) determining the value of one or more properties of insoluble particulates;
(C) providing a proposed suspending agent; wherein the suspending agent consists of a plurality of fibers;
(D) performing a first calculation of the suspendability of the proposed suspending agent as determined by a yield gravity function equation based on the value of the one or more properties of the base fluid and the insoluble particulates, and the value of at least one property of the proposed suspending agent, wherein properties of the proposed suspending agent include: the concentration of the fibers as weight per volume of the base fluid; the fiber length or the average fiber length based on a length distribution; the diameter of the fibers or the average fiber diameter based on a diameter distribution; the density of the fibers or the average density of the fibers based on a density distribution; the number of fibers per unit volume of the base fluid; and the stiffness of the fibers;
(E) evaluating if the result from the first calculation indicates a stable treatment fluid comprising the base fluid, the insoluble particulates, and the proposed suspending agent, or if the result does not indicate a stable treatment fluid, then:
  (i) modifying the value of at least one of the properties of the proposed suspending agent, the base fluid, the insoluble particulate, or combinations thereof; and
  (ii) performing a second calculation of the suspendability of the proposed suspending agent as determined by the yield gravity function equation based on the modified value, wherein the same or different property values are continued to be modified and the calculation is continued to be performed until the result indicates a stable treatment fluid; and
(F) introducing the stable treatment fluid into a wellbore.

20. A method of predictive modeling of a treatment fluid comprising:
(A) determining the value of one or more properties of a base fluid;
(B) determining the value of one or more properties of insoluble particulates;
(C) providing a proposed suspending agent;
(D) performing a first calculation of the suspendability of the proposed suspending agent as determined by a yield gravity function equation based on the value of the one or more properties of the base fluid and the insoluble particulates, and the value of at least one property of the proposed suspending agent;
(E) evaluating if the result from the first calculation indicates a stable treatment fluid comprising the base fluid, the insoluble particulates, and the proposed suspending agent, or if the result does not indicate a stable treatment fluid, then:
  (i) modifying the value of at least one of the properties of the proposed suspending agent, the base fluid, the insoluble particulate, or combinations thereof; and
  (ii) performing a second calculation of the suspendability of the proposed suspending agent as determined by the yield gravity function equation based on the modified value, wherein the same or different property values are continued to be modified and the calculation is continued to be performed until the result indicates a stable treatment fluid; and
(F) introducing the stable treatment fluid into a wellbore, wherein the treatment fluid is a drilling fluid or a fracturing fluid, and wherein the insoluble particulates are drill cuttings, a lost-circulation material, proppant, or combinations thereof.

* * * * *